United States Patent

[11] 3,612,874

[72] Inventor Charles R. Porter
    Corvallis, Oreg.
[21] Appl. No. 745,210
[22] Filed July 16, 1968
[45] Patented Oct. 12, 1971
[73] Assignee General Electric Company

[54] NEUTRON RADIOGRAPHY OF WELD JOINTS
    4 Claims, 4 Drawing Figs.

[52] U.S. Cl. ........................................... 250/83.1
[51] Int. Cl. ........................................... G01t 3/00
[50] Field of Search ............................... 250/83.1,
    84, 84.5, 65

[56] References Cited
    UNITED STATES PATENTS
3,393,126  7/1968  Burton et al. .............. 250/83.1 X
3,351,760  11/1967 Brown ........................ 250/106

OTHER REFERENCES

Atkins, H. L., " Biological Application of Neutron Radiography," Materials Evaluation, Sept. 1965, pp. 453–458.

Blanks et al., " Experiments With Foil-Film Combinations and Collimators for Neutron Radiography," Materials Evaluation, Feb. 1966, pp. 76–80.

Primary Examiner—James W. Lawrence
Assistant Examiner—Davis L. Willis
Attorneys—Ivor J. James, Jr., Samuel E. Turner, John R. Duncan, Frank L. Neuhauser, Oscar B. Waddell and Melvin M. Goldenberg ABSTRACT: A nondestructive neutron radiographic technique capable of producing improved radiographs of weld joints is disclosed. Lack of contrast in neutron radiographs of two pieces which have been welded together makes resolving fine gaps in the weld difficult. In the disclosed system, one of the two pieces to be welded is doped with a small amount of a material having a high neutron absorption cross section. This provides the desired radiographic contrast and permits the inspection of an entire weld in one radiograph.

PATENTED OCT 12 1971    3,612,874

INVENTOR:
CHARLES R. PORTER

BY: John R. Duncan
ATTORNEY

NEUTRON RADIOGRAPHY OF WELD JOINTS

BACKGROUND OF THE INVENTION

Neutron radiography is a useful technique for nondestructive testing of a variety of objects. Generally, a neutron radiograph is produced by passing a beam of neutrons through the object to be radiographed and then on to an imaging system including a sheet of conversion material. The conversion material has the property of emitting charged particles (either promptly or with a finite half-life) when irradiated with neutrons. These particles are registered by a detector sheet which is either in contact with the conversion material during neutron irradiation or is placed in contact therewith after irradiation. The detector is developed in a suitable manner to give a visible image which accords with the neutron absorption and scattering characteristics of the radiographed objects. Typically, the detector sheet may be a track-registration material such as described in U.S. Pat. No. 3,457,408, an electroluminent screen as described in U.S. Pat. No. 2,344,042 or conventional photographic film, as described in U.S. Pat. No. 2,733,353.

While neutron radiography ordinarily utilizes a neutron beam from an external source, such as a port in a nuclear reactor, it is possible to produce autoradiographs where the object to be radiographed itself contains a neutron-emitting material. A typical neutron autoradiographic system is described in U.S. Pat. No. 3,493,751.

Neutron radiography has certain advantages over other radiographic techniques, such as X-ray radiography, in several applications. Neutron radiography is capable of detecting and imaging areas of low atomic number material in a matrix of high atomic number material, where the low atomic number material is a strong neutron absorber or scatterer. A typical application is the examination of weld penetration and component placement in nuclear fuel elements and nuclear thermionic devices which incorporate materials such as uranium, plutonium, tungsten, zirconium, molybdenum and the like. The technique is also useful in the nondestruction examination of welds and interior conditions of highly radioactive objects such as irradiated nuclear fuel elements and nuclear heat sources.

The examination of the integrity of welded joints using X-ray radiography is well known. This requires, however, the observation of fine gaps to detect imperfections in weld penetration. Contrast between the two pieces to be welded is not generally practical, since it requires the pieces to be of markedly dissimilar metals. Neutron radiography of conventionally welded joints suffers from the same problems. Very fine gaps are difficult to resolve, since neutron radiographic resolution is not generally high as that obtainable with X-rays.

Encapsulated gamma sources, e.g. cobalt-60, radium-226, cesium-137, etc., which are in common use for medical and industrial purposes, must be carefully sealed to avoid leakage and spread of contamination. Generally, the enclosure is sealed by welding. Since the gamma radiation emitted often prevents X-radiographic inspection of the weld, cumbersome, less direct methods of determining weld integrity must be used. Typically, the source is immersed in liquid nitrogen and then in water while carefully watching for the release of nitrogen bubbles trapped in weld defects. Neutron radiography would be preferred, since it is more direct and convenient. However, present neutron radiographic techniques do not provide sufficient image contrast and resolution.

Thus, there is a continuing need for improved neutron radiographic systems giving improved image resolution and contrast.

SUMMARY OF THE INVENTION

It is, therefore, an object of this invention to provide a neutron radiographic system overcoming the above-noted problems.

Another object of this invention is to provide a neutron radiographic system capable of improved image contrast and resolution.

Another object of this invention is to provide an improved neutron autoradiographic system.

The above objects, and others, are accomplished in accordance with this invention, basically, by doping one of the metal pieces to be welded together with a small amount of a material having a high neutron absorption cross section, welding the pieces together, then passing a beam of neutrons through the weld area to a neutron-imaging system, whereby a high contrast, high resolution, neutron radiographic image of the weld results. If desired, where a welding or brazing technique is used in which material, such as from a welding rod, is added to the weld, the dopant may be included in the added material. However, for best results, including highest contrast and clearest indication of weld diffusion, it is preferred that one of the pieces to be welded together contain the dopant.

Any suitable high absorption cross section material may be used as the contrast-increasing dopant. Typical high neutron absorption cross section materials include gadolinium-157, boron-10, cadmium-113, samarium-149, ytterbium-168, and mixtures thereof. Gadolinium-157 is preferred because of its especially high absorption cross section.

The amount of dopant may be very small, depending on the relative neutron-absorption cross sections of the dopant and base material and the contrast desired. Typically, as little as about 10 p.p.m. (parts per million) gadolinium-157 would be useful with zirconium, titanium and aluminum, while steel, molybdenum and tungsten would require from about 0.01 weight percent to about 0.2 weight percent gadolinium-157 for high-contrast imaging. Where the welded object is to be used in a nuclear reactor, e.g., where it is the cladding for nuclear fuel material, it is preferred that up to about 0.2 weight percent dopant be used, to assure high-contrast imaging while minimizing undesirable neutron absorption by the dopant in the reactor.

Any suitable neutron source may be used, as desired. Typical neutron sources would include a neutron beam port in a nuclear reactor or neutron-emitting material contained within a container or a composite material which is being welded. Where the welded container or material produces the neutrons, the system would be in the nature of autoradiography.

Any suitable converter material may be placed to receive neutrons which have passed through the weld area. Typical conversion materials which emit detectable radiation such as heavy fission fragments when irradiated with neutrons include gadolinium-157, uranium-235, plutonium-239, lithium-6, boron-10, indium-115 and mixtures thereof.

Any suitable material may be used in the detector material which forms a visible image when contacted by the detectable radiation, such as fission fragments, emitted by the conversion material. Typical detector materials include conventional photographic film, various luminescent materials, and certain track-registration materials such as are described in copending U.S. Pat. No. 3,457,408.

Any suitable welding technique may be used in the formation of the welds to be neutron radiographed. Typical welding techniques include arc welding, tungsten inert gas welding, etc.

BRIEF DESCRIPTION OF THE DRAWING

Details of the invention will be further understood upon reference to the drawings, wherein.

DETAILED DESCRIPTION OF THE INVENTION

Figure 1A:
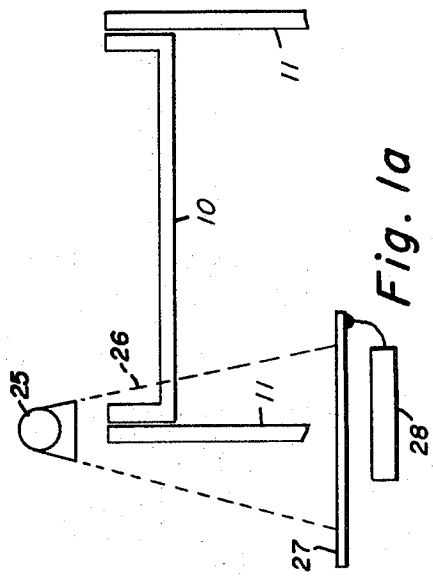
FIGS. 1a and 1b illustrate neutron radiograph and associated instrumentation of pieces before and after welds according to the prior art.

In the drawings, 25 represents a source of neutrons, 26 represents a beam of neutrons, 27 represents a converter sheet and 28 represents a detector receiving the conversion electrons from the converter sheet.

Figure 1B:
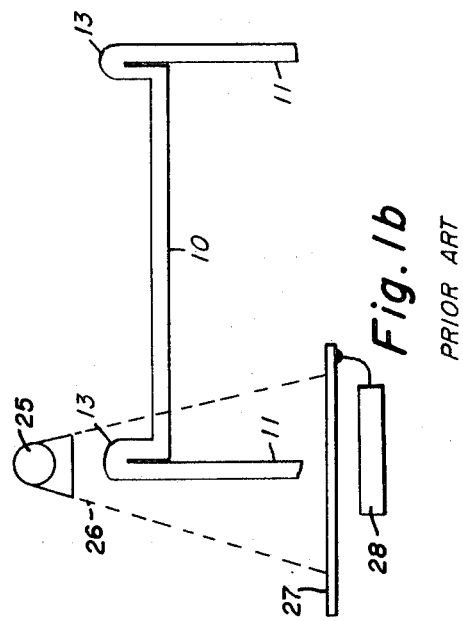

Referring now to FIG. 1a, there is seen a U-shaped member 10 and a pair of bars 11. Before welding, a neutron radiograph would produce an image as seen in FIG. 1*1* as a uniform gray image on a white background. After welding, the image would be as seen in FIG. 1b. While it is apparent that portions of both member 10 and bars 11 have melted at 13, the neutron radiograph does not indicate whether the two parts to be joined have diffused together.

Figure 2A:
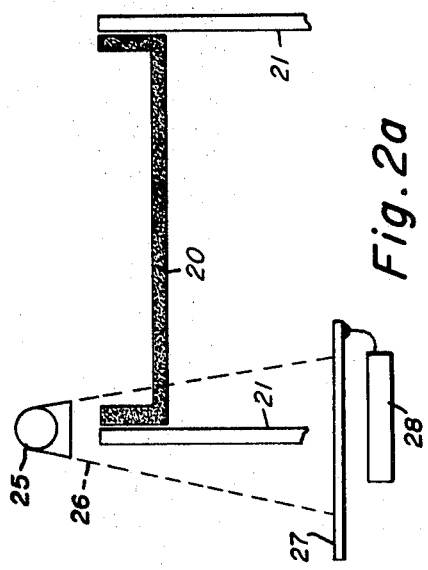
FIGS. 2a and 2b illustrate neutron radiograph and associated instrumentation of pieces before and after doped welds according to this invention.
Figure 2B:
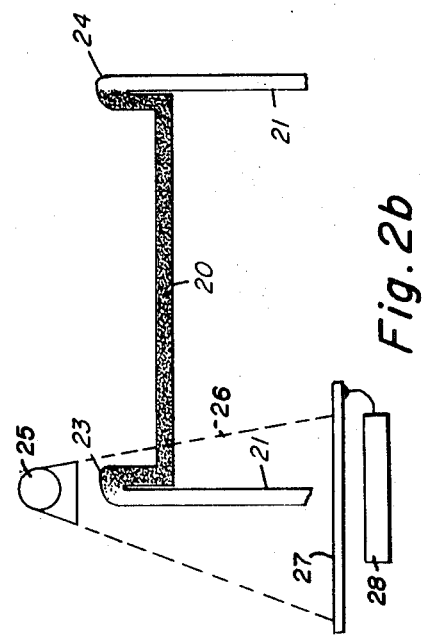

FIGS. 2a and 2b symbolically illustrate a similar welding operation where one of the pieces to be welded has been doped with a strong neutron absorber. As seen in FIG. 2a, U-shaped member 20 shows up as a much darker gray in the neutron radiograph than do bars 21.

After welding, as shown in FIG. 2b, complete diffusion in the weld is indicated in a neutron radiograph by a gray shading across welds 23, indicating diffusion of molten doped metal into molten undoped metal, and vice versa. An imperfect weld in seen at 24, where there has been very little diffusion, resulting in a weak weld. Such an imperfect weld does not necessarily show up in a conventional neutron radiograph, as shown in FIG. 1b.

It is vital that high quality welds be assured in many modern applications. For example, in the manufacture of fuel rods for nuclear reactors it is essential that strong welds be produced between end plugs and the fuel containing tubular cladding. Using the technique of this invention, with end plugs fabricated from doped metal, the quality of large numbers of fuel rods may be tested on a rapid, production line basis.

The following examples further specifically define the present invention with respect to improved weld-inspection techniques. Parts and percentages are by weight, unless otherwise indicated. The examples are intended to illustrate various preferred embodiments of the present invention.

EXAMPLE I

A plurality of Valloy zirconium alloy tubes having a diameter of about 0.5 inch, of the sort used to contain nuclear fuel material in nuclear reactors, are prepared for capping with welded end plugs. The Valloy zirconium alloy contains about 99.77 weight percent zirconium, about 1.15 weight percent chromium and about 0.08 weight percent iron. Four end plugs are prepared from material as follows: (1) Valloy zirconium alloy, (2) Valloy plus about 0.03 weight percent gadolinium-157, (3) Valloy plus about 0.06 weight percent gadolinium-157, and (4) Valloy plus about 0.10 weight percent gadolinium. Each end plug is welded to a tube using a conventional tungsten inert gas technique. Each weld is then neutron radiographed using an exposure of about 30 minutes to a neutron flux of about $10^6$ neutrons per square centimeter per second, as emitted from a 0.5-inch pinhole in the 30 kw. Nuclear Test Reactor at Vallecitos Nuclear Center, Pleasanton, Calif. A conventional gadolinium converter plate having a thickness of about 0.005 inch is placed to receive neutrons which have passed through the weld. The converter plate absorbs neutrons and emits conversion electrons, exposing a sheet of Eastman Kodak Company X-ray film, Type T, which is held against the converter plate. The films are developed in conventional photographic developing solution and examined. Quality of the weld between the tube and end plug containing no gadolinium is difficult, since there is no contrast between the pieces. Where the end plug contains 0.03 weight percent gadolinium, there is noticeable contrast through the weld. Excellent contrast is observed where the weld plugs contain 0.06 and 0.10 weight percent gadolinium. In these neutron radiographs diffusion of metal through the weld is easily observed. While amounts of gadolinium beyond 0.06 weight percent slightly improves contrast, the improvement is not sufficient to justify the increased quantity of gadolinium, which absorbs neutrons which might otherwise be useful in maintaining the nuclear reaction where the capped tube is used in a nuclear reactor.

EXAMPLE II

Several tubes having a diameter of about two inches are prepared from Type 304 stainless steel (80.196 weight percent iron, 0.07 weight percent carbon, 1.15 weight percent manganese, 0.022 weight percent phosphorus, 0.012 weight percent sulfur, 0.60 weight percent silicon, 18.43 weight percent chromium and 9.52 weight percent nickel). Three caps are prepared as follows: (a) Type 304 stainless steel, (b) Type 304 doped with about 0.1 weight percent boron-10, and (c) 0.5 weight percent boron-10. Each cap is welded in place on a tube using conventional arc-welding techniques. Each weld is then neutron-radiographed as described in Example I, except that Eastman Kodak Company Type M X-ray film is used and exposure is continued for about 60 minutes. The films are conventionally developed and examined. With no dopant, the weld is difficult to evaluate, since there is no contrast between the welded pieces. Excellent contrast is seen in the welds using the doped cap material. Diffusion of metal from the two pieces through the weld can clearly be seen.

Although specific materials, conditions and components have been described in the above examples, other suitable materials, as listed above, may be used with similar results. In addition, other materials may be added to the welding materials to synergize, enhance or otherwise modify their properties.

Other modifications and ramifications of the present invention will occur to those skilled in the art upon reading the present disclosure. These are intended to be included within the scope of this invention.

I claim:

1. A method of radiographing welds of a first piece of metal to a second piece of metal which comprises the steps of:
   a. doping the first piece of metal with a dopant having a high neutron absorption cross section prior to the welding of the first piece to the second piece;
   b. passing a beam of neutrons through the first piece and the second piece after welding so that the beam is received on a converter sheet; and
   c. receiving conversion electrons from said converter sheet in a detector, whereby a contrast neutron radiographic image is formed in said detector of the welded pieces showing the extent of diffusion during welding between the piece doped with the high neutron-absorption cross section material and the undoped piece.

2. The method of claim 1 wherein said dopant is selected from the group consisting of gadolinium-157, boron-10, cadimium-113, samarium-149, indium-115, ytterbium-168 and mixtures thereof.

3. The method of claim 1 wherein said dopant is gadolinium-157.

4. The method of claim 1 wherein said first piece of metal contains up to about 0.2 weight percent of said dopant.